United States Patent
Kobilka et al.

(10) Patent No.: US 10,259,951 B2
(45) Date of Patent: Apr. 16, 2019

(54) ORGANIC CONDUCTIVE COATING MATERIALS

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

(*) Notice: Subject to any disclaimer, the term of this patent is extended or adjusted under 35 U.S.C. 154(b) by 307 days.

(21) Appl. No.: 15/214,103

(22) Filed: Jul. 19, 2016

(65) Prior Publication Data
US 2018/0025813 A1 Jan. 25, 2018

(51) Int. Cl.
*C09D 5/24* (2006.01)
*H01B 1/12* (2006.01)
*H01B 1/02* (2006.01)
*C09D 7/63* (2018.01)
*C08K 5/18* (2006.01)
*C08K 5/3417* (2006.01)

(52) U.S. Cl.
CPC ............ *C09D 5/24* (2013.01); *C09D 7/63* (2018.01); *H01B 1/02* (2013.01); *H01B 1/124* (2013.01); *C08K 5/18* (2013.01); *C08K 5/3417* (2013.01)

(58) Field of Classification Search
CPC ....................................... C09D 5/24
See application file for complete search history.

(56) References Cited

U.S. PATENT DOCUMENTS

| 8,137,452 B2 | 3/2012 | Posset et al. |
| 8,236,422 B2 | 8/2012 | Williams et al. |
| 9,029,473 B2 | 5/2015 | Cormack et al. |
| 2006/0113509 A1 | 6/2006 | Norenberg et al. |
| 2010/0035359 A1 | 2/2010 | Cormack et al. |
| 2015/0072164 A1 | 3/2015 | Petralia et al. |
| 2015/0221793 A1* | 8/2015 | Okubo ............ H01L 31/022466 136/256 |

FOREIGN PATENT DOCUMENTS

| CN | 103554547 B | 4/2015 |
| CN | 105524497 A | 4/2016 |
| WO | WO 2006/125589 A1 | 11/2006 |

OTHER PUBLICATIONS

Akay, et al., "Preparation of Nanostructured Microporous Metal Foams through Flow Induced Electroless Deposition", Journal of Nanomaterials, vol. 2015, Jul. 2015, 17 pages, Article ID 275705, Hindawi Publishing Corporation, New York, NY.

(Continued)

*Primary Examiner* — William P Watkins, III
(74) *Attorney, Agent, or Firm* — Peter Edwards

(57) ABSTRACT

A process of forming a hydrophobic, conductive barrier on a metallic surface includes coating the metallic surface with a solution that includes an organic, conductive material. The organic, conductive material has a conductive group that includes a triphenylamine group or a carbazole group. The organic, conductive material also has a dithiocarbamate group to bind the organic, conductive material to the metallic surface.

18 Claims, 5 Drawing Sheets

(56) References Cited

OTHER PUBLICATIONS

Rinnerbauer, et al., "Nanoimprinted superlattice metallic photonic crystal as ultra-selective solar absorber", in Optica, vol. 2, issue 8, pp. 743-746, Aug. 2015, Optical Society of America (OSA) Publishing, Washington D.C.

Velev et al., "A class of porous metallic nanostructures", Brief Communications, Materials, Nature, vol. 401, No. 6753, Oct. 1999, p. 548, Macmillan Magazines Ltd (online, nature.com), URL: http://www.nature.com/nature/journal/v401/n6753/full/401548a0.html.

Fleischer, et al., "Surface Tension—Theoretical Background", Tel Aviv University School of Chemistry, Chemical Physics Course, Laboratory Experiment, Tel Aviv University (tau.ac.il.com) online, [accessed May 27, 2016], 6 pages, URL: http://www.tau.ac.il/~phchlab/experiments_new/surface_tenstion/theory.html.

Faramarzi, et al., "Light-triggered self-construction of supramolecular organic nanowires as metallic interconnects", Nature Chemistry (online, nature.com), vol. 4, Jun. 2012, pp. 485-490, Nature Publishing Group/Macmillan Publishers, London, UK.

Kacsandi, "Manufacturing a Porous, Hydrophobic Metallic Surface", Request for Proposal, NineSights.com (online), Jan. 2016, 3 pages, URL: https://ninesights.ninesigma.com/rfps/-/rfp-portlet/rfpViewer/3010?utm_source=SilverpopMailing&utm_medium=email&utm_campaign=REQ1301074%20-%20Manufacturing%20a%20Porous%20Hydrophobic%20Metallic%20Surface%20-%20Extension%20%281%29&utm_content=&spMailingID=24506005&spUserID=MTAyNjMyODUzMzA1S0&spJobID=722535030&spReportId=NzlyNTM1MDMwS0.

Faramarzi, et al., "Light-triggered self-construction of supramolecular organic nanowires as metallic interconnects", Supplementary Information, Nature Chemistry (online, nature.com), vol. 4, Jun. 2012, 12 pages, Nature Publishing Group/Macmillan Publishers, London, UK.

Dong, et al., "Investigation on the Antibacterial Micro-Porous Titanium with Silver Nano-Particles", Journal of Nanoscience and Nanotechnology, vol. 13, No. 10, Oct. 2013, pp. 6782-6786(5), URL: www.ncbi.nlm.nih.gov/pubmed/24245143.

Hang et al., "Super-hydrophobic nickel films with micro-nano hierarchical structure prepared by electrodeposition", Applied Surface Science, vol. 256, Issue 8, pp. 2400-2404, Feb. 2010, ScienceDirect.com (online), Elsevier BV, URL: www.sciencedirect.com/science/article/pii/S0169433209015190.

Frederick, et al., "Relaxation of Exciton Confinement in CdSe Quantum Dots by Modification with a Conjugated Dithiocarbamate Ligand", ACS Nano, May 4, 2010, (6), pp. 3195-3200, American Chemical Society, Washington DC, USA. (URL: pubs.acs.org/doi/abs/10.1021/nn1007435).

Frederick, et al., "Control of Exciton Confinement in Quantum Dot-Organic Complexes through Energetic Alignment of Interfacial Orbitals", Nano Letter, Dec. 13, 2012, (1), pp. 287-292, American Chemical Society, Washington DC, USA. (URL: pubs.acs.org/doi/abs/10.1021/n1304098e).

\* cited by examiner

Metallic Surface

ORGANIC CONDUCTIVE COATING MATERIALS

BACKGROUND

Field of the Invention

The field of the invention is conductive materials.

Description of Related Art

Micro-porous and nano-porous metallic surfaces and membranes have a wide variety of uses ranging from antibacterial surfaces to catalytic microreactors to photonic absorbers. These applications span a broad range of industries and consumer goods. Variations in the nanoscale characteristics of a functional surface may have a significant impact on performance characteristics, such as conductivity, in some applications. To illustrate, minor alterations in contact angle, porosity, and patterning may result in significant impacts on particular performance characteristics.

SUMMARY

According to an embodiment, a process of forming a hydrophobic, conductive barrier on a metallic surface is disclosed. The process includes coating the metallic surface with a solution that includes an organic, conductive material. The organic, conductive material has a conductive group that includes a triphenylamine group or a carbazole group. The organic, conductive material also has a dithiocarbamate group to bind the organic, conductive material to the metallic surface.

According to another embodiment, an article of manufacture includes a metallic material and an organic, conductive material that is disposed on a surface of the metallic material. The organic, conductive material has a conductive group that includes a triphenylamine group or a carbazole group. The organic, conductive material also has a dithiocarbamate group to bind the organic, conductive material to the surface of the metallic material. The organic, conductive material forms a hydrophobic, conductive barrier on the surface of the metallic material.

According to another embodiment, a process of forming an article of manufacture having a porous hydrophobic metallic surface is disclosed. The process includes forming a porous metallic material and coating the porous metallic material with a solution that includes an organic, conductive material. The organic, conductive material forms a hydrophobic, conductive barrier on a surface of the porous metallic material. The organic, conductive material has a conductive group that includes a triphenylamine group or a carbazole group. The organic, conductive material also has a dithiocarbamate group to bind the organic, conductive material to the surface of the porous metallic material.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
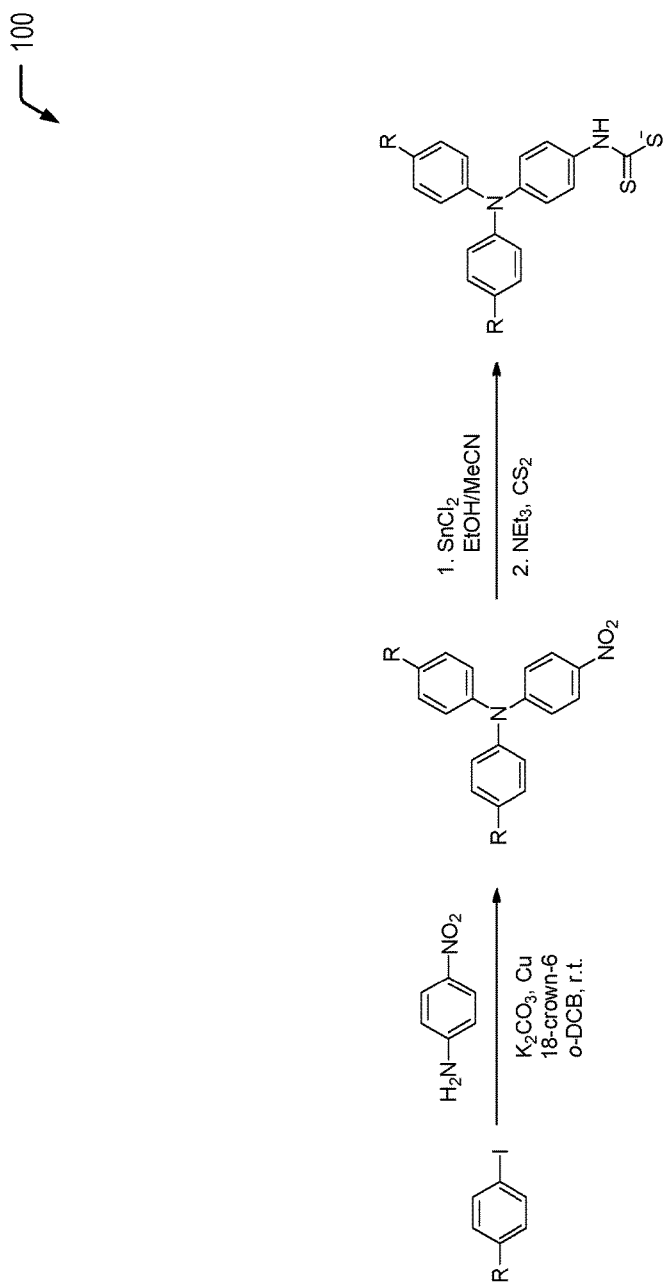
FIG. 1 is a chemical reaction diagram illustrating a process of forming a triphenylamine-dithiocarbamate conductive, organic material, according to one embodiment.

The present disclosure describes organic, conductive materials that may be utilized as a coating material that may act as a hydrophobic, conductive barrier on a metallic surface, among other possible applications. In an example application, the organic, conductive materials of the present disclosure may be utilized in a process of manufacturing a porous, hydrophobic metallic surface that satisfies particular performance characteristics. For example, the organic, conductive materials of the present disclosure may be used to generate a micro-porous and hydrophobic metallic surface that can withstand alkaline environments.

As an illustrative, non-limiting example, a metallic surface (e.g., nickel) that is coated with the organic, conductive material(s) of the present disclosure may have a surface that exhibits a "mesh" of apertures no larger than 5-10 micrometers in size, a contact angle greater than 120° (e.g., 150°), and may be permeable to gases/non-aqueous mixtures but not aqueous mixtures. While electropotential deposition techniques have been utilized to form conductive, microporous metallic surfaces that also exhibit hydrophobicity, there may be challenges associated with imparting such characteristics via such deposition techniques.

The techniques described herein represent an alternative approach that does not use electrodeposition. In particular, utilizing the organic, conductive material(s) of the present disclosure to coat a metallic surface may overcome challenges associated with attempts to impart such characteristics via electrodeposition techniques. Typically, conductive coatings display varying degrees of hydrophilicity. The present disclosure describes methods to generate a hydrophobic metallic surface with tunable pore sizes ranging from the nanoscale to the macroscale that does not use electrodeposition techniques.

Triphenylamines have been utilized to impart conductivity on metallic surfaces. Dithiocarbamate linkers have been utilized to bind conjugated organic molecules to nanoparticles (quantum dots) and to achieve overlap of charged particles and excitons (via overlapping wave functions) from the organic molecule to the nanoparticle and vice versa. The present disclosure describes procedures to synthesize a triphenylamine and carbazole (related to triphenylamine) to include a dithiocarbamate linker. These conductive organic molecules can be bound to a variety of metallic surfaces/particles to maintain conductivity and to impart hydrophobicity.

As described further herein, in a particular embodiment, porous metallic surfaces may be generated using techniques that utilize plastic nano or microbeads to create a lattice. The lattice is then infused with the desired metal, and the plastic lattice is removed via high temperature degradation, dissolved, or oxidized by washing with common solvents. The organic, conductive molecules of the present disclosure may be synthesized from commercially available alkyl or alkoxy iodobenzenes, or carbazole via a multi-step pathway involving subsequent nucleophilic aromatic substitution, reduction, and "acyl" nucleophilic addition. Functionalization with dithiocarbamate serves two purposes. The dithiocarbamate allows the conducting molecule to bind to the metallic surface and simultaneously allows charge transfer to occur from the organic molecule to the metallic particle. After synthesis of the conductive molecules, the conductive molecules may be deposited onto the metallic particles via solution deposition techniques. This process may be done either before or after the metal particles are applied to the latex/plastic matrix.

Referring to FIG. 1, a chemical reaction diagram 100 depicts a process of forming a triphenylamine conductive molecule that includes a dithiocarbamate linker, according to one embodiment. As illustrated and described further herein with respect to FIG. 3, the organic, conductive molecule formed according to the process depicted in FIG. 1 may be used as a coating material that may act as a hydrophobic, conductive barrier on a metallic surface. The triphenylamine group of the organic material of FIG. 1 imparts conductivity on the metallic surface. The dithiocarbamate group of the organic material of FIG. 1 binds to the metallic surface and simultaneously allows charge transfer to occur from the organic material to the metallic surface.

The first chemical reaction of FIG. 1 illustrates that iodobenzene with alkyl or alkoxy chains (represented as "R" in FIG. 1) may be reacted with 4-nitroaniline under nucleophilic aromatic substitution conditions to give a nitro-functionalized triphenylamine. In some cases, the R groups may have a carbon chain of length C1 to C20. In some cases, the R groups may also contain phenyl groups, benzyl groups, vinyl groups, or allyl groups. Other positions on the aryl groups of the triarylamines may also be beneficial. The R group may be selected such that the R group triggers self-assembly. In a particular embodiment, R groups of C8 to C17, and benzyl groups may trigger self-assembly.

In the second chemical reaction depicted in FIG. 1, the nitro group of the nitro-functionalized triphenylamine is reduced to an amine using tin chloride (identified as step 1 in FIG. 1). In other cases, alternative reduction conditions may be utilized. The amine is then reacted with carbon disulfide under basic conditions with trimethylamine (or another appropriate base) to give the dithiocarbamate anionic functionality (identified as step 2 in FIG. 1).

Prophetic Example: Formation of
Nitro-Functionalized Triphenylamine

In one flask, 4-nitroaniline (2 mmol) and a 4-alkyl/alkoxy/etc.-iodophenol (8 mmol) may be dissolved in DMF (8 mL) under argon. The solution may then be added dropwise to a mixture of copper iodide (0.8 mmol), potassium carbonate (16 mmol) and L-proline (1.6 mmol) in a 25 mL Schlenck flask (large diameter), and the reaction mixture may be stirred vigorously at 115° C. It should be noted that these conditions may result in higher yield than alternative reaction schemes, but may require longer reaction times. The reaction may be stirred and stopped after 7 days. The mixture may be cooled down to room temperature and ethyl acetate EtOAc (15 mL) may then be added. The solution may be passed through a pad of silica gel and washed with EtOAc (300 mL) to remove all copper salts. The resulting organic phase may be concentrated under reduced pressure. Further purification of the crude mixture may be performed by column chromatography (e.g., $SiO_2$, Pentane to Pentane/$Et_2O$: 3/1).

Prophetic Example: Formation of Triphenylamine
with Dithiocarbamate Linker (Step 1 in FIG. 1) A solution of the nitro-triarylamine compound (0.14 mmol) and tin dichloride (354 mg, 1.57 mmol) in acetonitrile (2.3 mL) and ethanol (1.9 mL) may be stirred overnight under reflux. After that time, the solution may be cooled down to room temperature and diluted with ethyl acetate (15 mL). The organic phase may be washed with saturated, aqueous $Na_2CO_3$ (2×10 mL) and brine (10 mL), dried over $MgSO_4$ and concentrated under reduced pressure. The resulting product may be clean enough to be used as such in the next step.

(Step 2 in FIG. 1) The amino-triarylamine from the previous step (1.0 eq.) may be added to a solution of carbon disulphide (1.1 eq.) and triethylamine (1.1 eq.) in dichloromethane (DCM) at 0° C. After 15 minutes, methyl iodide (1.1 eq.) may be added dropwise, and the reaction may be stirred at room temperature for 2 hours, followed by trituration in cold hexane. Other amine bases may be used here.

Figure 3:
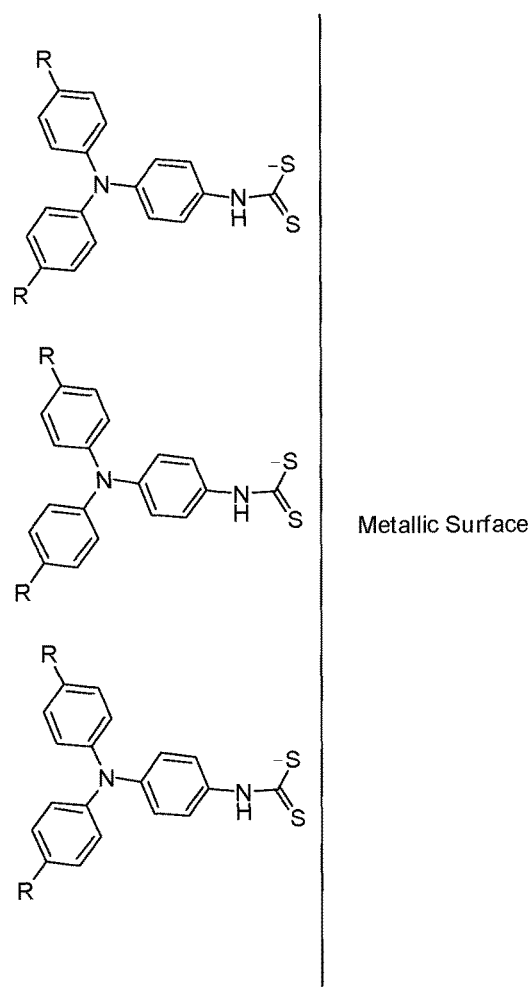
FIG. 3 is a diagram illustrating a metallic surface that is coated with the triphenylamine-dithiocarbamate conductive, organic material of FIG. 1 to form a hydrophobic, conductive barrier on the metallic surface.

Thus, FIG. 1 illustrates an example of a process of forming an organic, conductive material that may be used as a coating material to form a hydrophobic, conductive barrier on a metallic surface (as illustrated and further described herein with respect to FIG. 3). The triphenylamine group of the organic material of FIG. 1 imparts conductivity on the metallic surface. The dithiocarbamate group of the organic material of FIG. 1 binds to the metallic surface and simultaneously allows charge transfer to occur from the organic material to the metallic surface. As described further herein, a metallic surface (e.g., nickel) that is coated with the organic, conductive material depicted in FIG. 1 may have a surface that exhibits a "mesh" of apertures no larger than 5-10 micrometers in size, a contact angle greater than 120° (e.g., 150°), and may be permeable to gases/non-aqueous mixtures but not aqueous mixtures.

Figure 2:
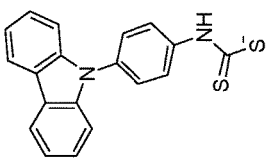
FIG. 2 is a chemical reaction diagram illustrating a process of forming a carbazole-dithiocarbamate conductive, organic material, according to one embodiment.
Figure 2:
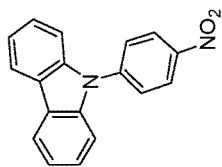
Figure 2:
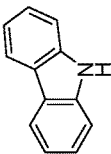

Referring to FIG. 2, a chemical reaction diagram 200 depicts a process of forming a carbazole-based conductive molecule that includes a dithiocarbamate linker, according to one embodiment. As illustrated and described further herein with respect to FIG. 4, the organic, conductive molecule formed according to the process depicted in FIG. 2 may be used as a coating material that may act as a hydrophobic, conductive barrier on a metallic surface. The carbazole group of the organic material of FIG. 2 (similar to the triphenylamine group of FIG. 1) imparts conductivity on the metallic surface. The dithiocarbamate group of the organic material of FIG. 2 binds to the metallic surface and simultaneously allows charge transfer to occur from the organic material to the metallic surface.

The first chemical reaction of FIG. 2 illustrates that a carbazole may be reacted with 4-fluoro-nitrobenzene under nucleophilic aromatic substitution conditions to give a nitro-functionalized N-phenylcarbazole. In the second chemical reaction depicted in FIG. 2, the nitro group of the nitro-functionalized N-phenylcarbazole is then reduced to an amine using tin chloride (identified as step 1 in FIG. 2). In other cases, alternative reduction conditions may be utilized. The amine is then reacted with carbon disulfide under basic conditions with trimethylamine (or another appropriate amine base) to give the dithiocarbamate anionic functionality (identified as step 2 in FIG. 2).

Prophetic Example: Formation of
Nitro-Functionalized N-Phenylcarbazole

A mixture of carbazole (1.0 eq.), NaH or $K_2CO_3$ (5.0 eq.), 4-fluoronitrobenzene (3.5 eq.), and DMF or DMAc may be heated at reflux for 24 hours. Once cooled to room temperature, the mixture may be poured into an excess of warm (40° C.) water. The solid may be collected by filtration, and the crude material may be washed with several portions of warm water (40° C.) and then recrystallized from toluene and then from chloroform to afford the product as bright yellow crystals.

Prophetic Example: Formation of
N-Phenylcarbazole with Dithiocarbamate Linker

The reaction may be performed in a similar fashion to the example previously described with respect to the formation of the triphenylamine with dithiocarbamate linker of FIG. 1.

Figure 4:
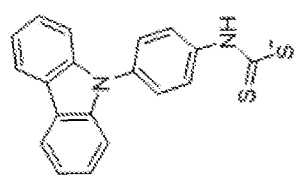
FIG. 4 is a diagram illustrating a metallic surface that is coated with the carbazole-dithiocarbamate conductive, organic material of FIG. 2 to form a hydrophobic, conductive barrier on the metallic surface.
Figure 4:
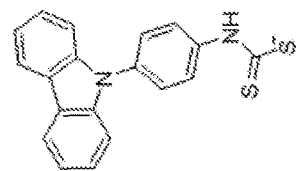
Figure 4:
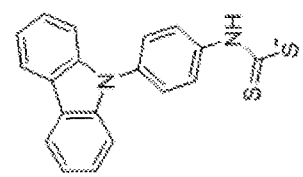

Thus, FIG. 2 illustrates an example of a process of forming an organic, conductive material that may be used as a coating material to form a hydrophobic, conductive barrier on a metallic surface (as illustrated and further described herein with respect to FIG. 4). The carbazole group of the organic material of FIG. 2 imparts conductivity on the metallic surface. The dithiocarbamate group of the organic material of FIG. 2 binds to the metallic surface and simultaneously allows charge transfer to occur from the organic material to the metallic surface. As described further herein, a metallic surface (e.g., nickel) that is coated with the organic, conductive material depicted in FIG. 2 may have a surface that exhibits a "mesh" of apertures no larger than 5-10 micrometers in size, a contact angle greater than 120° (e.g., 150°), and is permeable to gases but not aqueous mixtures.

Referring to FIG. 3, a diagram 300 depicts a metallic surface that is coated with the triphenylamine-dithiocarbamate conductive organic material of FIG. 1 to form a hydrophobic, conductive barrier on the metallic surface. The triphenylamine group of the organic material of FIG. 1 imparts conductivity on the metallic surface. The dithiocarbamate group of the organic material of FIG. 1 binds to the metallic surface and simultaneously allows charge transfer to occur from the organic material to the metallic surface. In a particular embodiment, the metallic surface of FIG. 3 may be a porous metallic surface that may be generated using techniques that utilize plastic nano or microbeads to create a lattice.

An example of a process of forming a porous, metallic surface may include establishing a lattice matrix by depositing plastic particles onto a desired surface. The plastic that is used in the lattice particles can be latex, other polymers with relatively low decomposition temperatures, or those with satisfactory solubility in common solvents. As an illustrative, non-limiting example, the plastic nano or microbeads may include a polystyrene material. In other cases, alternative and/or additional polymeric material(s) may be used in the spheres to create a lattice or matrix for the metallic particles. Other polymeric materials with similar or lower decomposition temperature profiles include polyethylene, poly(vinyl alcohol), polybutadiene, ABS copolymer, polyisoprene, polypropylene, poly(methyl methacrylate), polyacetals, and poly(vinyl chloride), among other alternatives. The lattice is then infused with the desired metal (e.g., nickel), and the plastic lattice is removed via high temperature degradation, dissolved, or oxidized by washing with common solvents.

The plastic particle size can also be chosen to control the size of the voids (or final pore size) in the lattice and can range from the micro-scale to the nano-scale. The plastic matrix is then infused with the desired metal. This may be accomplished by filtering an aqueous colloidal solution of metallic particles through the plastic matrix until the matrix is saturated with the metallic particles. This porous surface-forming procedure can be applied directly on the desired surface. The resulting composite is then dried, and the plastic is removed via thermal degradation processes (e.g., including calcination) at elevated temperature. In order to limit the cracking of the film, it is desirable to remove all of the solvent from the filtration step prior to calcination and thermal degradation of the plastic. This can be accomplished by raising the metal infused matrix to a temperature sufficient to evaporate the solvent without excessive or violent boiling. After the solvent has been removed, the calcination procedure can be carried out to remove the plastic particles. Alternative procedures for removal of the plastic include, but are not limited to, dissolution in common solvents (e.g., chloroform or THF), and oxidation with aqueous acid.

After synthesis of the organic, conductive molecules of FIG. 1, the organic, conductive molecules of FIG. 1 may be deposited onto the metallic particles via solution deposition techniques. This process can be performed either before or after the metal particles are applied to the latex/plastic matrix. The conducting molecules bind to the metallic surface/particles through the dithiocarbamate group.

Thus, FIG. 3 illustrates an example of a metallic surface that is coated with a conductive organic material of the present disclosure to form a hydrophobic, conductive barrier on the metallic surface. In a particular embodiment, the metallic surface (e.g., nickel) that is coated with the organic, conductive material of FIG. 1 may have a surface that exhibits a "mesh" of apertures no larger than 5-10 micrometers in size, a contact angle greater than 120° (e.g., 150°), and may be permeable to gases/non-aqueous mixtures but not aqueous mixtures.

Referring to FIG. 4, a diagram 400 depicts a metallic surface that is coated with the carbazole-dithiocarbamate conductive organic material of FIG. 2 to form a hydrophobic, conductive barrier on the metallic surface. The carbazole group of the organic material of FIG. 2 imparts conductivity on the metallic surface. The dithiocarbamate group of the organic material of FIG. 2 binds to the metallic surface and simultaneously allows charge transfer to occur from the organic material to the metallic surface. In a particular embodiment, the metallic surface of FIG. 4 may be a porous metallic surface that may be generated using techniques previously described herein with respect to FIG. 3.

After synthesis of the organic, conductive molecules of FIG. 2, the organic, conductive molecules of FIG. 2 may be deposited onto the metallic particles via solution deposition techniques. In some cases, light may be utilized to cause the organic, conductive molecules to self-assemble. This process can be performed either before or after the metal particles are applied to the latex/plastic matrix. The conducting molecules bind to the metallic surface/particles through the dithiocarbamate group.

Thus, FIG. 4 illustrates an example of a metallic surface that is coated with a conductive organic material of the present disclosure to form a hydrophobic, conductive barrier on the metallic surface. In a particular embodiment, the metallic surface (e.g., nickel) that is coated with the organic, conductive material of FIG. 2 may have a surface that exhibits a "mesh" of apertures no larger than 5-10 micrometers in size, a contact angle greater than 120° (e.g., 150°), and is permeable to gases/non-aqueous mixtures but not aqueous mixtures.

Figure 5:
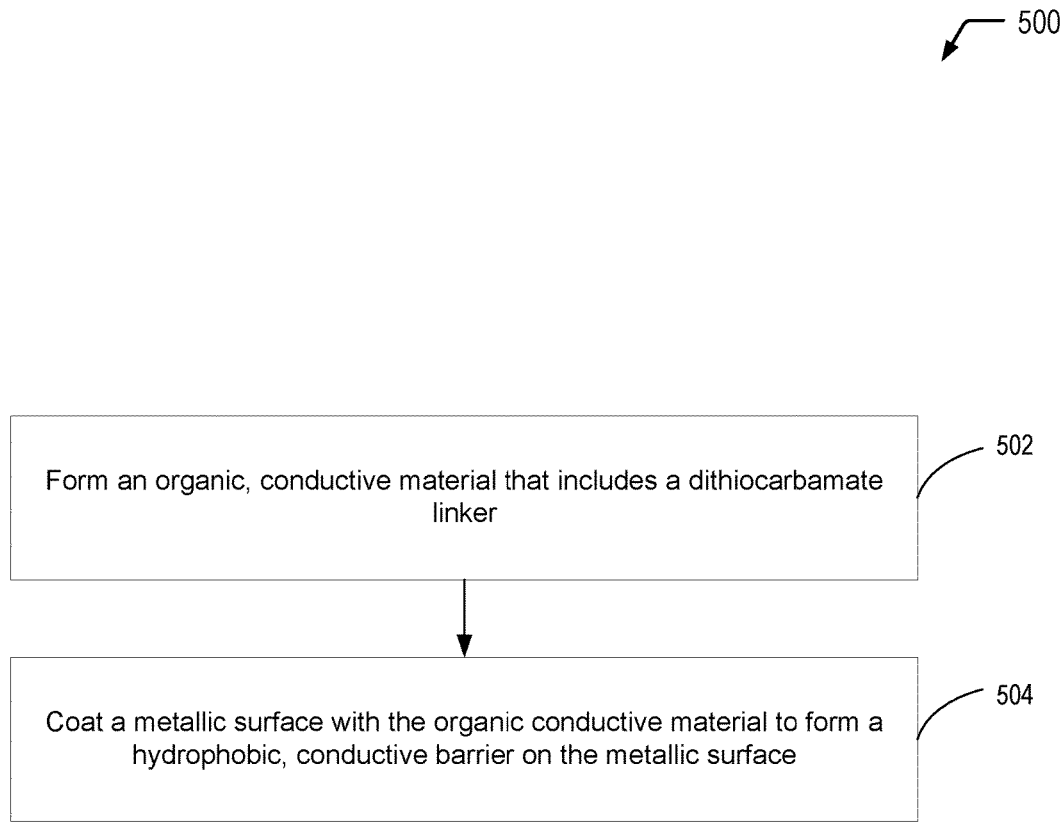
FIG. 5 is a flow diagram showing a process of utilizing the conductive, organic materials of the present disclosure as a coating material to form a hydrophobic, conductive barrier on a metallic surface, according to one embodiment.

Referring to FIG. 5, a flow diagram illustrates an exemplary process 500 of utilizing the conductive, organic material(s) of the present disclosure as a coating material to form a hydrophobic, conductive barrier on a metallic surface. In the particular embodiment illustrated in FIG. 5, operations associated with an example process of forming an organic, conductive material that includes a dithiocarbamate linker are identified as operation 502, while operations associated with coating a metallic surface with the organic, conductive material are identified as operation 504. It will be appreciated that the operations shown in FIG. 5 are for illustrative purposes only and that the operations may be performed in alternative orders, at alternative times, by a single entity or by multiple entities, or a combination thereof. As an example, one entity may form the organic, conductive material that includes the dithiocarbamate linker, another entity may form the metallic material to be coated with the organic, conductive material, while another entity may coat the metallic material with the organic, conductive material.

The process 500 includes forming an organic, conductive material that includes a dithiocarbamate linker, at 502. As an example, the organic, conductive material may include the triphenylamine conductive molecule that includes the dithiocarbamate linker that is formed according to the process described herein with respect to FIG. 1. As another example, the organic, conductive material may include the carbazole conductive molecule that includes the dithiocarbamate linker that is formed according to the process described herein with respect to FIG. 2.

The process 500 includes coating a metallic surface with the organic, conductive material, at 504. The organic, conductive material forms a hydrophobic, conductive barrier on the metallic surface. As an example, FIG. 3 illustrates a metallic surface (e.g., nickel) that is coated with the organic, conductive material of FIG. 1. As another example, FIG. 4 illustrates a metallic surface (e.g., nickel) that is coated with the organic, conductive material of FIG. 2. In some cases, the metallic surface may be coated with a combination of the conductive organic materials of FIG. 1 and FIG. 2. As described further herein, the triphenylamine/carbazole group imparts conductivity on the metallic surface, and the dithiocarbamate group binds to the metallic surface and simultaneously allows charge transfer to occur from the organic material to the metallic surface.

In a particular embodiment, the conductive, hydrophobic metallic surface formed according to the process 500 depicted in FIG. 5 may satisfy particular performance characteristics. As an example, a metallic surface (e.g., nickel) that is coated with the organic, conductive materials of the present disclosure may have a surface that exhibits a "mesh" of apertures no larger than 5-10 micrometers in size, a contact angle greater than 120° (e.g., 150°), and may be permeable to gases/non-aqueous mixtures but not aqueous mixtures.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a hydrophobic, conductive barrier on a surface of a metallic material, the process comprising applying a solution that includes a triphenylamine-dithiocarbamate compound to a surface of a metallic material.

2. The process of claim 1, wherein the triphenylamine-dithiocarbamate compound has the following structural formula:

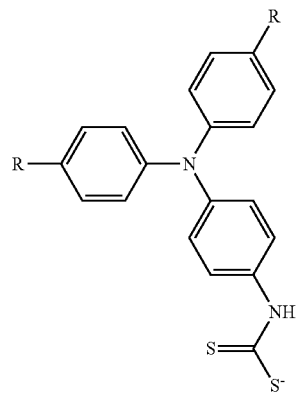

wherein R represents an alkyl group or an alkoxy group.

3. The process of claim 2, further comprising forming the triphenylamine-dithiocarbamate compound from a nitro-functionalized triphenylamine compound having the following structural formula:

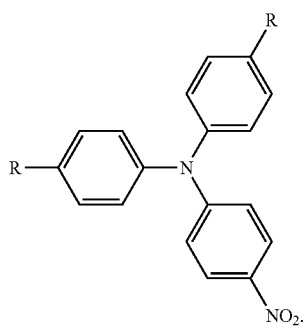

4. The process of claim 1, wherein the surface of the metallic material includes a micro-porous surface or a nano-porous surface.

5. The process of claim 1, wherein the metallic material includes a nickel material.

6. The process of claim 1, wherein the surface of the metallic material includes a plurality of apertures, each aperture of the plurality of apertures having a size in a range of 5 micrometers to 10 micrometers.

7. The process of claim 1, wherein the surface of the metallic material has a contact angle that is greater than 120°.

8. The process of claim 7, wherein the surface of the metallic material has a contact angle of about 150°.

9. The process of claim 1, wherein the surface of the metallic material is permeable to gaseous materials but not to aqueous materials.

10. A process of forming a hydrophobic, conductive barrier on a surface of a metallic material, the process comprising:

applying a solution that includes a carbazole-dithiocarbamate compound to a surface of a metallic material, wherein the carbazole-dithiocarbamate compound has the following structural formula:

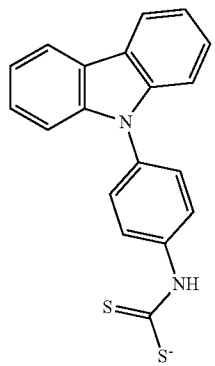

11. The process of claim 10, further comprising forming the carbazole-dithiocarbamate compound from a nitro-functionalized carbazole compound having the following structural formula:

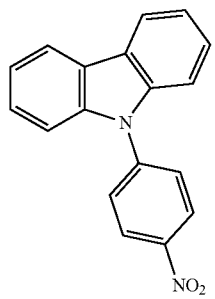

12. The process of claim 10, wherein the surface of the metallic material includes a micro-porous surface or a nano-porous surface.

13. The process of claim 10, wherein the metallic material includes a nickel material.

14. The process of claim 10, wherein the surface of the metallic material includes a plurality of apertures, each aperture of the plurality of apertures having a size in a range of 5 micrometers to 10 micrometers.

15. The process of claim 10, wherein the surface of the metallic material has a contact angle that is greater than 120°.

16. The process of claim 15, wherein the surface of the metallic material has a contact angle of about 150°.

17. The process of claim 10, wherein the surface of the metallic material is permeable to gaseous materials but not to aqueous materials.

18. A process of forming a carbazole-dithiocarbamate compound, the process comprising:

chemically reacting a carbazole compound with 4-fluoronitrobenzene to form a nitro-functionalized N-phenylcarbazole compound, the nitro-functionalized N-phenylcarbazole compound having the following structural formula:

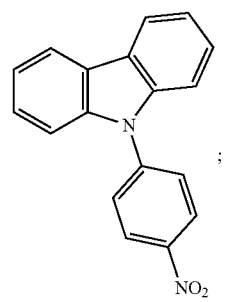 [SMILES: O=[N+]([O-])c1ccc(-n2c3ccccc3c3ccccc32)cc1]

and utilizing the nitro-functionalized N-phenylcarbazole compound to form a carbazole-dithiocarbamate compound having the following structural formula:

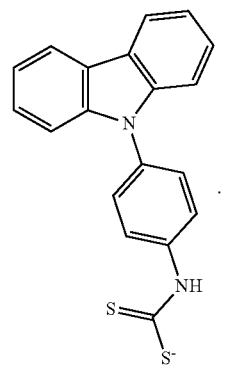 [SMILES: S=C([S-])Nc1ccc(-n2c3ccccc3c3ccccc32)cc1]

* * * * *